Dec. 31, 1968
R. A. PHILIBERT ET AL
3,419,756
GROUND FAULT RESPONSIVE SYSTEM FOR ELECTRIC
POWER DISTRIBUTION APPARATUS
Filed March 11, 1966
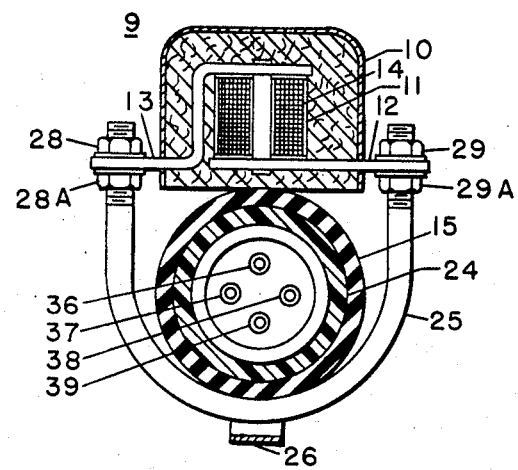
FIG. 1
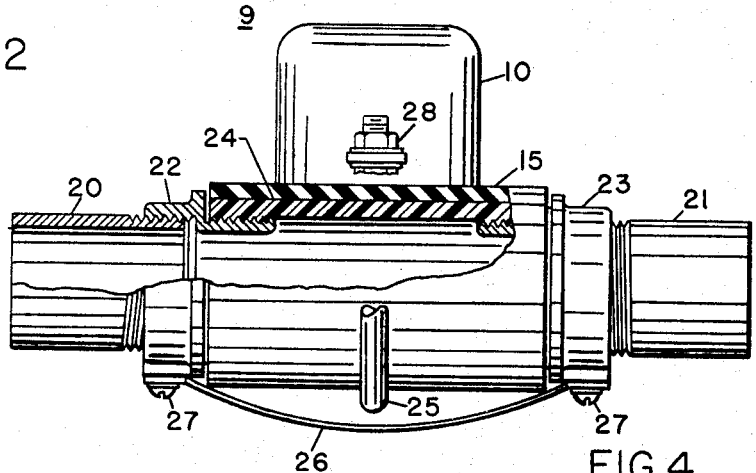
FIG. 2
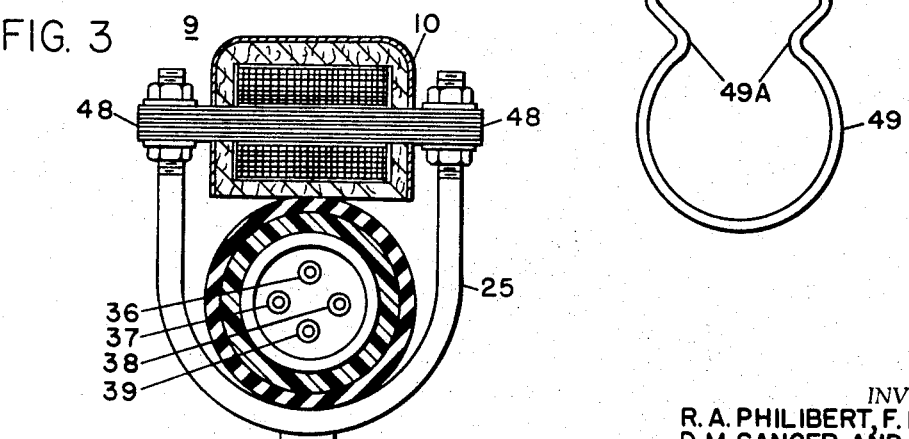
FIG. 3
FIG. 4
INVENTORS
R. A. PHILIBERT, F. L. BROWNE,
D. M. SANGER AND G. A. KIRK
BY
*Forest B. Hitchcock*
THEIR ATTORNEY Dec. 31, 1968  R. A. PHILIBERT ET AL  3,419,756
GROUND FAULT RESPONSIVE SYSTEM FOR ELECTRIC
POWER DISTRIBUTION APPARATUS INVENTORS
R. A. PHILIBERT, F. L. BROWNE,
D. M. SANGER AND G. A. KIRK
BY
*Forest B. Hitchcock*
THEIR ATTORNEY

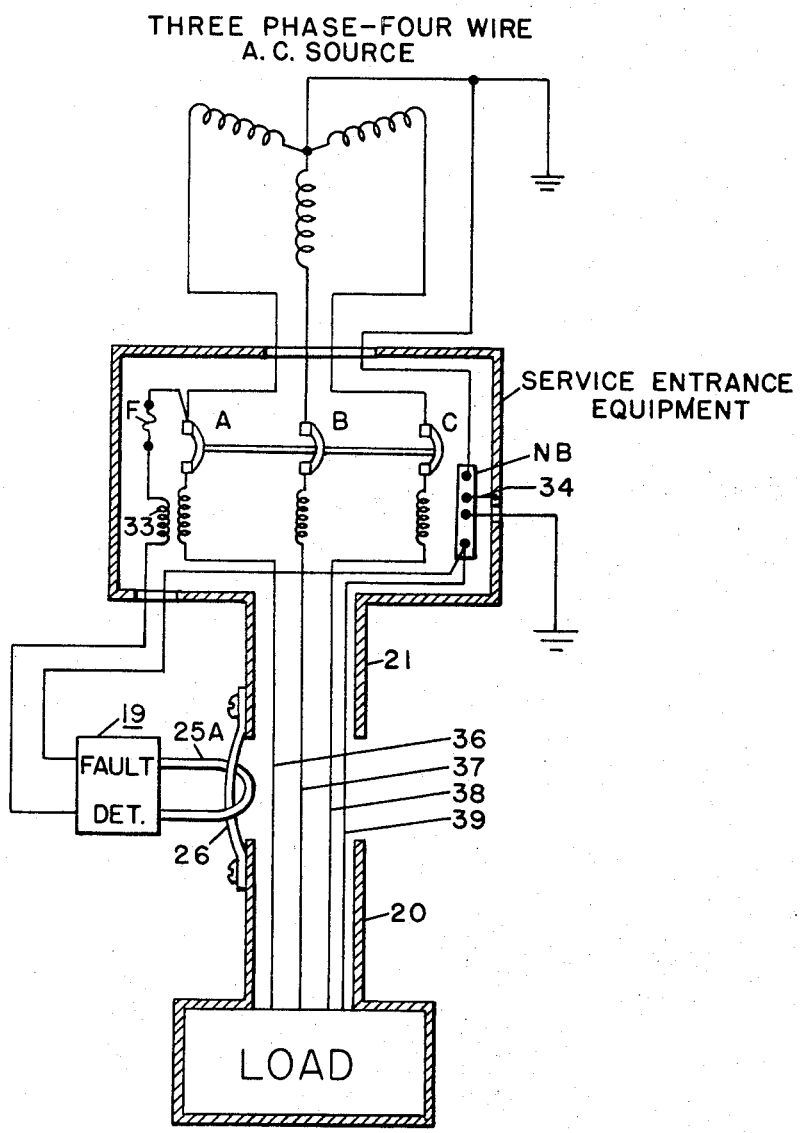

FIG. 10 TYPICAL CIRCUIT
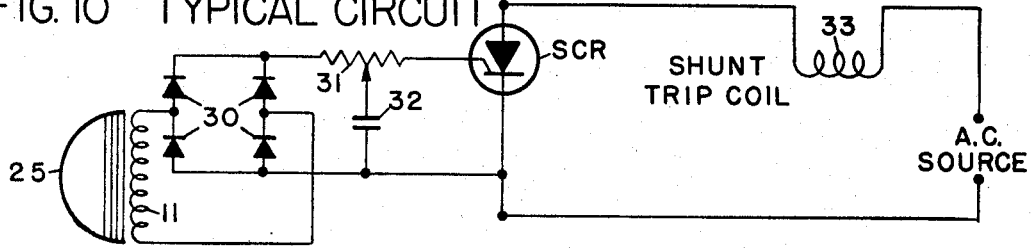
FIG. 11 DELAY CIRCUIT
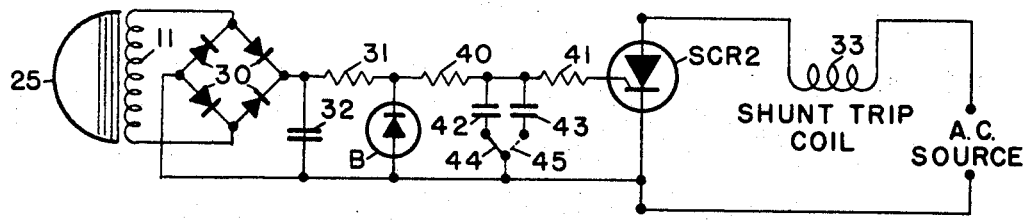
FIG. 12 FULL ACTUATION
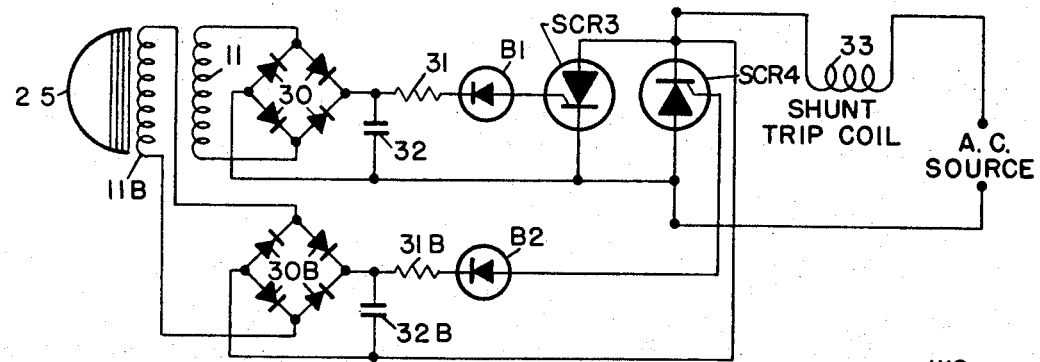
FIG. 13 TWO-LEVEL CIRCUIT
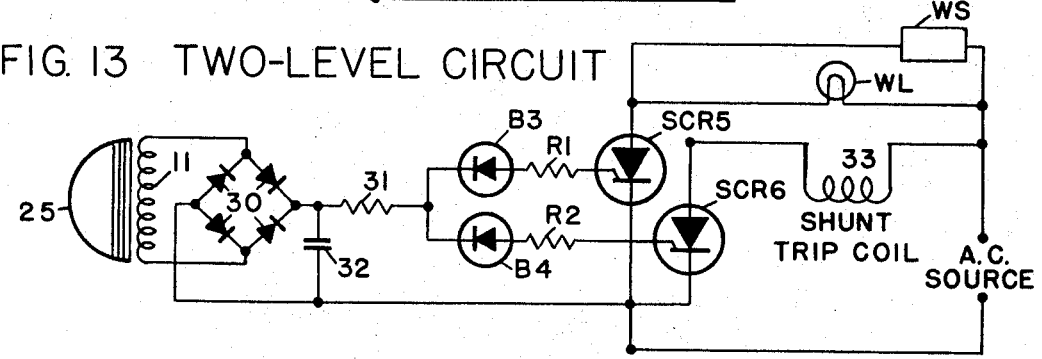
INVENTORS
R. A. PHILIBERT, F. L. BROWNE,
D. M. SANGER AND G. A. KIRK
BY
*Forest B. Hitchcock*
THEIR ATTORNEY United States Patent Office 3,419,756
Patented Dec. 31, 1968

3,419,756
GROUND FAULT RESPONSIVE SYSTEM FOR ELECTRIC POWER DISTRIBUTION APPARATUS
Robert A. Philibert, Rockville Centre, and Frank L. Browne, Wantagh, N.Y., and David M. Sanger, Livingston, and George A. Kirk, deceased, late of Ridge-Wood, N.J., by Stella Kirk, legal representative, Ridgewood, N.J., assignors to General Signal Corporation and O.Z. Electrical Manufacturing Co., Inc., New York, N.Y., both corporations of New York
Filed Mar. 11, 1966, Ser. No. 533,733
7 Claims. (Cl. 317—16)

ABSTRACT OF THE DISCLOSURE

A ground fault detector having a magnetic pick up circuit which is of relatively low permeability to protect the controlled circuitry from extremely high voltages. Such detector is constructed to be mounted over an insert of insulating material between the two ends of spaced conduit sections with a strap of conductive cable connecting the spaced ends of the conduit sections outside of the pick up magnetic circuit of the detector.

Background of invention

This invention relates to ground fault protective systems for electric power distribution apparatus, and more particularly relates to such a system wherein metal enclosed electrical apparatus is supplied power by circuits sheathed by grounded metal duct.

It is customary in power distribution systems to bring the power circuits to an inside grounded sheet metal housing, or service entrance equipment, for enclosing and protecting the different feeder or utilization circuits connected to such power circuits through suitable master overload apparatus as well as over-load apparatus associated with each feeder circuit. Such service entrance equipment is generally known as "switch gear," "switch boxes," "panelboards," or "switch boards," and such equipment is normally grounded by connection to a cold water pipe directly entering the ground, or in other suitable ways. The various feeder circuits are usually individual insulated conductors or sheathed multiple conductor cables which are carried through a metal duct to the apparatus to be controlled.

By metal duct is meant any metallic sheath or covering for one or more electric current conductors, including for example, bus ducts, busways, raceways, and armored cable, but more commonly such a duct takes the form of a metal pipe or conduit for carrying the conductors or cable. All of this metal duct is normally interconnected to the grounded switch box so that any one working around the metal casing of the electrical apparatus receiving power is protected from the electric circuits themselves and from any ground faults that may develop.

With regard to grounded systems, the power supply has the neutral grounded at the power source, such as the transformer neutral, or the generator neutral. The power circuits, including insulated phase conductors and the insulated neutral conductors, are brought into the service entrance equipment. The phase conductors are connected to the phase buses, and the neutral conductors are connected to the neutral bar or the neutral bus. The neutral bar is connected to a ground, preferably a cold water pipe, a driven ground, or other suitable means. The neutral bar is also connected to the sheet metal enclosure, providing the grounding of the enclosure. The various feeder circuits, consisting of the phase conductors and the neutral conductor (if used), known as load conductors, are usually individually insulated conductors, or sheathed multiple conductor cables, which are carried through grounded metallic ducts, which provide a return path for phase-to-ground fault currents to the power source.

With regard to undergrounded systems, the power supply such as transformers and generators are ungrounded. However, the housing of the power supply, the housing of the service entrance equipment and the housing of the utilization equipment is usually bonded together whereby they are at the same potential. The power source housing and the service entrance equipment housing are usually grounded at each location, or at least at one of the locations. The service entrance conductors are brought in, similar to the grounded system, except there is no neutral bus. The various feeder circuits are usually individually insulated conductors, or sheathed multiple conductor cables which are carried through grounded metallic ducts, which provide a return path for phase-to-ground fault currents when more than one phase-to-ground fault occurs. The phase-to-ground current flows between the two or more grounded faults. The amount of current flowing in the grounding conductor will be more when the phase-to-ground faults occur in opposing phases.

In such distribution systems as above described, it can happen that a fault or faults can occur in the insulation of a conductor grounding it through the metal ducts, or through other grounding conductive means. However, the present invention proposes the use of simple apparatus for detecting phase-to-ground fault currents and either giving an appropriate warning or removing the application of power directly, or doing both.

It is a well recognized fact that the use of fuses or circuit breakers for each different load circuit gives quite adequate protection against actual overloads in such circuit. However, the occurrence of a fault between one of the conductors and a grounded metal duct may cause a sufficient electrical discharge to result in starting a fire, since the current value of such discharge, due to the possible higher impedance of the fault circuit, is less than the usual current load and is not adequate to actually open the circuit by the fuses or circuit breakers. This is because the overload equipment is set for a normal load current with suitable margins, and the addition of the fault current to the normal load current still is not sufficient to blow the fuses or operate the circuit breaker. However, such a fault current can be dangerous. The present invention proposes to protect against such undesirable fault currents.

In addition, the prior art proposes to use differential relays to protect against an unbalanced current in multiple phase circuits. Where such protection is designed to trip the circuit breakers considerably below the normal load characteristics of the circuit, this provides a satisfactory solution although it is relatively expensive and difficult to apply. The present invention proposes a simple device and system for protection of such circuits from phase-to-ground fault currents.

Summary of the invention

In accordance with the present invention, a detecting means is provided which is responsive to ground fault current directly in either single or multi-phase systems. This simple device with its self-encapsulated electronic responsive apparatus can supply control for either a warning system or for a system of protection by cutting off the source of power, or both.

In brief, it is proposed to provide a magnetic core which can completely encircle the conductor or conductors which may carry the fault current together with solid state devices for giving an output when the fault current occurs and rises above a preselected value. Such core is so designed as to operate with flux values over a feasible range for a wide range of fault currents. Such operating flux is produced to an amount sufficient to effectively operate the device at some preselected fault current, but the flux rises gradually even though the fault current continues to rise to excessive values. Thus, the coil located on the core and the associated solid state devices are protected against excessive voltages even when high fault currents occur. This means that the present invention is itself immune to extreme conditions which can exist in the event of relatively large fault currents, and is thus not damaged under severe conditions, but is ready to act even though it may be repeatedly actuated in response to exceedingly high fault currents.

A general object of this invention is the provision of apparatus repsonsive to phase-to-ground faults in electric power distribution apparatus which is inexpensive to manufacture, easy to apply, and even more sensitive for protective purposes than some of the elaborate and expensive relay apparatus provided in the prior art.

A further object of the invention is to provide such protective apparatus in a rather compact form so that it can be applied to the distribution system at any convenient location.

Another object of the present invention is to provide a simple device connectible into a conduit organization which is responsive to fault currents, and which may be readily applicable to systems already installed.

Other objects, purposes and characteristic features of the present invention will be in part obvious from the accompanying drawings, and in part pointed out as the description of the invention progresses.

*Brief description of the drawings*

In describing the invention in detail, reference will be made to the accompanying drawings, in which like reference characters designate corresponding parts throughout the several views, and in which:

FIG. 1 is a sectional view of the differential fault current detector shown as mounted on an insulated section in the conduit;

FIG. 2 is a side view of the fault current detector showing the insulated section in the conduit for mounting the detector apparatus of FIG. 1;

FIG. 3 is a modified form of the differential fault current detector showing a structure for increasing the sensitivity of the device;

FIG. 4 is a modified form of the core of the differential fault current detector wherein the sensitivity of the device is further increased with respect to the adjacent conductors;

FIG. 9B shows a general circuit organization for the use of the fault detector system of FIGS. 5, 6, 7 and 8;

FIG. 10 shows a circuit diagram for use with any of the FIGURES 1 through 8 giving a direct response to the presence of a fault current;

FIG. 11 is a modified form of FIG. 10 which provides a system with selectable periods of time delay with respect to its response of a fault current;

FIG. 12 illustrates a modification of FIG. 10 showing the manner of providing a full-wave control current for the shunt trip coil for the circuit breaker;

FIG. 13 is a modified form of FIG. 10 showing a two-level system with one level for giving a warning and another level for tripping the circuit breaker.

For the purpose of simplifying the illustration and facilitating the explanation, the various parts and circuits constituting the embodiment of the invention have been shown diagrammatically and certain conventional illustrations have been employed. The drawings have been made more with the purpose in mind of making it easy to understand the principles and mode of operation of the invention, than with the idea of illustarting the specific construction and arrangement of parts that would be employed in practice.

Figure 9A:
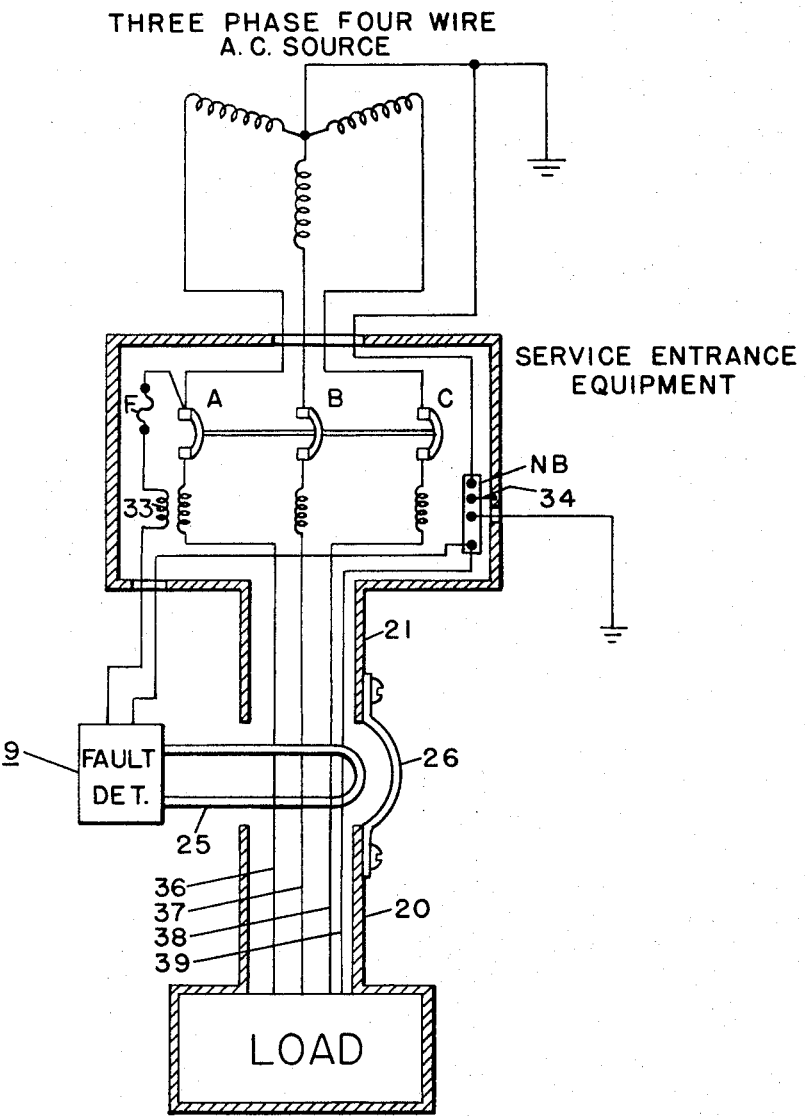
FIG. 9A shows a general circuit organization for the use of the fault detector system of FIGS. 1, 2, 3 and 4.

To facilitate an understanding of the invention, the device of FIG. 1 and 2 will be first described, following which the description will point out how the circuitry of FIG. 10 encapsulated in the box or container portion of the device of FIGS. 1 and 2. Following such description, it will be shown how the system of the present invention is employed in a general distribution system such as shown in FIG. 9A.

Referring to FIG. 1, a cover member 10 encloses a coil 11 with two arms 12 and 13 extending from the coil core 14 in opposite directions. Inside of the cover 10, the parts just described together with the various diodes and solid state devices of FIG. 10, are encapsulated in a suitable compound, such as epoxy resin or other potting material (see FIG. 14). This cover 10 is turned upside down for receiving the plastic compound so that when it solidifies it will form a flat solid base as shown in FIG. 1.

The assembled detector unit 9 is then mounted over an insulated section 24 of a metal duct or metal conduit as viewed in FIG. 2. For example, the two conduit sections 20 and 21 are joined by having the collars 22 and 23 attached to their respective ends. These collars 22 and 23 may be made of any suitable metal such as malleable iron, brass, bronze and the like. An insulating sleeve 24 is threaded or cemented between the collars 22 and 23. This sleeve may be of any suitable type insulation such as fiber, suitable plastic base, or other type of molded insulating material. The sleeve 24 is covered by a soft rubber cushion 15 which requires slight stretching to be fitted over the sleeve 24. The detector unit 9 is fastened in place over the cushion 15 and insulating member 24 by the U-bolt 25 by nuts 28 and 29 to the ends of the core extensions or arms 12 and 13 connected to the core 14. The iron nuts 28 and 29 are then tightened sufficiently to slightly compress the rubber cushion 15 and thus firmly hold the unit 9 in place. Also, the iron back nuts 28a and 29a are tightened against arms 12 and 13 to lock their respective nuts 28 and 29 in position.

An electrically conductive ground strap 26 interconnects the metal collars 22 and 23 and is suitably attached thereto by screws 27. With reference to FIG. 9A, it will be seen that the strap 26 renders the conduit electrically complete for carrying any ground currents between the load and the metal service entrance equipment to ground.

It will be noted that the core 14, the core extensions 12 and 13 together with the U-bolt 25 are all constructed of a suitable iron so as to provide a complete magnetic path which may conveniently be termed a magnetic core means. This magnetic core means is shown in FIG. 1 as surrounding the conductors 36, 37, 38 and 39 shown in FIG. 9A. The current flowing in such conductors produces magnetic flux for each phase which is approximately 120° out of phase with the others. When the currents in the conductors are relatively equal, the net flux in the magnetic core means will be substantially zero. However, as later described, the occurrence of a ground between one of the conductors and the conduit, will cause an unbalanced current in one of the conductors and thus an unbalanced flux condition will be produced in the magnetic core means.

Referring to FIG. 10, the U-bolt 25 and its connections to the core 14 are symbolically illustrated at 25 with the associated coil 11 (see FIG. 1). The coil 11 is connected to the diodes 30 which are connected in a bridge rectifying circuit. When an AC voltage is induced in coil 11, a uni-directional current is supplied through the resistor 31 to the capacitor 32 and gate of the silicon controlled rectifier SCR. When such uni-directional current rises to a certain predetermined current through the gate of the silicon controlled rectifier SCR, such device then becomes conductive and allows the AC source connected to its input terminals to supply sufficient energy to the shunt trip coil 33 to trip all of the circuit breakers A, B and C shown in FIG. 9A. The shunt trip coil 33 may be repeated for the circuit breakers for each phase, or this may be a master type of circuit breaker requiring only a single trip coil to open all phases.

Referring to FIG. 9A, the Three Phase Four Wire AC Source has its three phase conductors extending to the Service Entrance Equipment and connected through the circuit breakers A, B and C to the load. The mid-point of the source is grounded adjacent the source and such mid-point has a neutral conductor extending to the Service Entrance Equipment where it is connected to the neutral bus NB. A neutral conductor extends from NB to the load. The neutral bus NB is connected to the Service Entrance Equipment at 34, and it is also connected to a suitable ground.

Figure 14:
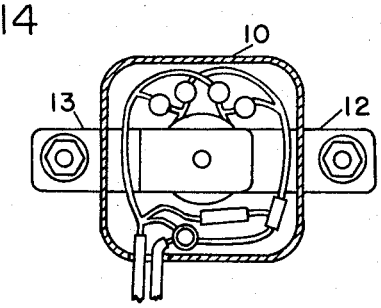
FIG. 14 is a cross section of the box portion of the unit shown in FIG. 1 and illustrates the encapsulated units shown in FIG. 10 as an example of the complete encapsulated unit of this invention.

The metal casing of the load is connected to the conduit section 20 which is in turn connected through conducting strip 26 to conduit section 21. The insulating section 24 of FIG. 2 is not shown in FIG. 9A, although it is assumed to be present. The magnetic core means 25 of the fault detector 9 surrounds the conductors 36, 37, 38 and 39 as shown in FIG. 1. The output terminals of the fault detector of FIGS. 1 and 2, as shown in FIG. 14, extends out of the box 10 to the shunt trip coil 33 and to the neutral bus NB. One terminal of the shunt trip coil 33 is connected through a fuse F to the entering phase conductor connected to circuit breaker A. In this way, the power source for that phase is connected to the circuitry of FIG. 10 across that phase and neutral. Thus, the AC source supplies the energy which is controlled by the silicon controlled rectifier SCR.

When the load is normally operated over the conductors 36, 37, 38 and 39, all of the currents flowing out of such conductors also return over such conductors so that the outgoing current balances the incoming current i.e. the vectorial sum of all the currents is substantially zero. Thus, there is no flux produced in the magnetic core means 25 of the fault detector. However, if a fault occurs between the conductor of one phase and ground so that a phase-to-ground current flows through the conduit, for example, then the ground current in that one phase conductor does not return to the source through the other phase conductors or the neutral conductor. Such differential current flow (added current) in said one conductor produces an electromagnetic alternating flux in the magnetic core means 25. This induces an alternating voltage in the coil 11 which in turn results in a current being applied to the shunt trip coil to open the circuit breakers when such phase-to-ground current rises to a particular predetermined value. This method of detecting fault current is commonly referred to as a "differential current detection" and is sometimes termed "zero sequencing."

When the predetermined value of fault or ground current is exceeded, a corresponding voltage is produced in the winding 11, which acts through the several components, which have their values appropriately selected, so as to trigger the silicon controlled rectifier SCR and allow current from the AC source to flow through the shunt trip coil 33 and thus open the circuit breakers as illustrated in FIG. 9A. The capacitor 32 is effective to filter the output of rectifier 30, and to provide a steady crest voltage which rises and falls depending upon the voltage produced in coil 11. It also removes any harmonic frequencies that might be present.

As shown in FIG. 9A, the magnetic core means 25 completely encircles the conductors 36, 37, 38 and 39. In FIG. 2 it can be noticed that the magnetic core means 25 is approximately at the mid-point between the collars 22 and 23 so that the flux from the conductors intercepts the magnetic core means 25. Such magnetic core means is so designed to operate over a variable range of flux values for a wide range of fault currents. This operating range of flux values is selected by suitably choosing the magnetic parts so that they have appropriate reluctance and will allow the flux to increase gradually over the wide range of possible ground currents. In addition, the conductors are somewhat loosely coupled with the magnetic core means, as can best be seen in FIG. 1. As above explained, the collars 22 and 23 can be of iron or other types of materials which are nonmagnetic.

However, when the collars 22 and 23 are of suitable magnetic material such as iron, and are so located as to be separated a distance in the order of an inch, such collars then act to cause the coupling between the various conductors to be substantially uniform with respect to the magnetic core means 25. As a matter of test in the laboratory, this uniformity of coupling when such distances are in the order of one inch appears to be highly desirable over the lack of uniform coupling when the iron collars are separated by a wider distance.

All of these factors tend to give a response of the tripping circuitry at a suitable preselected value of ground current, although ground currents of extremely high values fail to cause any adverse effects with regard to the fault detector apparatus.

In addition to the above, it may be desirable to obtain greater sensitivity with regard to the response of the fault detector to the fluxes produced in the magnetic core means. Such a structure is shown in FIG. 3 where the core 14 of FIGS. 1 and 2 is replaced by a group of laminations 48. These laminations are directly connected to the U-bolt 25 the same as shown in FIG. 1. However, the magnetic core means includes the U-bolt 25 is so selected to have sufficient reluctance as to spread the flux response of the device over a considerable range to correspond with a relatively high range of fault currents. In this way, the device although rendered somewhat more sensitive to fault currents is still given the spread of response so as to not be harmed by relatively high fault currents.

Another way in addition to the use of iron collars 22 and 23 spaced relatively close together, a core member 49, as shown in FIG. 4, can be suitably shaped so as to snugly fit around the insulated member 24 with its soft rubber cushion 15 in a manner to provide more equal coupling between such magnetic core means 49 and the different conductors. This means that the coupling between the conductors in different positions in the conduit and the magnetic core means including core means 49 is more nearly uniform even though no collars 22 and 23 are used. This is more true when the curved portions 49a come relatively close together.

Referring to FIG. 11, a circuit organization is shown which modifies FIG. 10. This circuit is the same as FIG. 10 with the exception that it has two added resistors 40 and 41 with associated capacitors 42 and 43. One or the other of these capacitors can be connected into the circuit by use of jumper wires 44 and 45 (jumper wire 44 is shown connected). A Zener diode B is connected between the base connection of the silicon controlled rectifiers SCR2 and the connection between resistors 31 and 40.

The capacitor 32 serves to maintain a relatively even crest of volttge for the output of the rectifier 30. The Zener diode B is effective to prevent this crest voltage from rising above a preselected value. This means that when a fault current occurs and the output of the rectifier is at or above said preselected value of voltage, the Zener diode maintains such preselected voltage and the capacitor 42 charges at a constant rate. When it becomes substantially charged, it causes a sufficient voltage to be applied to the gate of the silicon controlled rectifier SCR2 so that it is rendered conductive and allows the alternating current from the AC source to energize the shunt trip coil 33 and thus open the circuit breakers. In other words, the time delay is equal to the effective charging time of the capacitor 42. The gating voltage required for the silicon controlled rectifier SCR2 is just slightly below the above-mentioned preselected voltage value so that the silicon controlled rectifier SCR2 will be rendered conductive following the occurrence of a fault current after a predetermined time corresponding to the charging time of the capacitor 42.

The capacitor 43 is somewhat larger than capacitor 42, and when it is connected into the circuit by jumper 45 (assuming jumper 44 to be omitted) the time delay of this circuit organization is somewhat greater. It is of course to be understood that the desired amount of time delay selected with either jumper 44 or 45 can be determined by selecting the appropriate size capacitors 42 and 43. All of these components of FIG. 11 are mounted inside the cover 10 to constitute detector 9 but in place of the apparatus of FIG. 10 previously described.

With reference to FIG. 12, a full-wave actuation type of circuit is supplied so that the shunt trip coil 33 of FIG. 9A can be energized by full-wave alternating current from the AC source. The magnetic core means 25 is provided with two windings 11 and 11B each of which is connected to its respective rectifier unit 30 and 30B. The respective capacitors 32 and 32B tend to filter the rectifier output and will remove any harmonic frequencies which may be present. The silicon controlled rectifiers SCR3 and SCR4 are connected in multiple, but each has its own gate controlled through its respective Zener diode B1 and B2. Each of these Zener diodes is arranged to pass current only when such current is of an appropriate voltage, and the voltage at which the Zener diodes B1 and B2 pass such current is just slightly above the value of voltage required for the respective gates of silicon controlled rectifiers SCR3 and SCR4. This organization provides that upon the occurrence of a ground fault current, the shunt trip coil 33 abruptly receives alternating current as such fault current rises above a particular value.

This apparatus of FIG. 12 is also considered to be mounted within the cover 10 of FIGS. 1 and 2 instead of the apparatus of prior FIGS. 10 and 11 described above.

FIG. 13 shows a modified circuit arrangement which provides for two level response, one level being used for warning purposes and the other higher level being used to actuate the shunt trip coil 33 of the circuit breaker.

This form of FIG. 13 is somewhat similar to FIG. 10 in that only the single set of rectifiers 30 is required and the shunting capacitor 32 is employed for giving a steady crest and filtering out any harmonic frequencies that may have passed the rectifier. The output of the rectified current through resistor 31 is supplied respectively to rectifiers SCR5 and SCR6 through their respective Zener diodes B3 and B4 including resistors R1 and R2. The Zener diode B3 is conductive at a lower voltage than the Zener diode B4. Also, the silicon controlled rectifier SCR5 has its gate circuit such that current is passed through the cathode-anode circuit of SCR5 when its gate is of a slightly lower voltage than the voltage passed by the Zener diode B3.

The silicon controlled rectifier SCR6 has its gate circuit arranged to be conductive when energized to a voltage just slightly lower than that passed by the Zener diode B4. However, since the Zener diode B3 and silicon rectifier SCR5 are rendered effective at a lower voltage of fault current detected by the magnetic core means 25, the warning lamp WL and the warning sound device WS are energized in multiple from the AC source before the circuit breaker is tripped. The energization of these warning devices should bring someone's attention to the fact that a relatively low fault current has occurred in the system so that such person can take appropriate action. However, in the event that no action is taken, and the fault current becomes sufficiently high to cause the Zener diode B4 and the rectifier SCR6 to become conductive, the shunt trip coil 33 of the circuit breaker of FIG. 9A is actuated and the three phase supply is disconnected.

This two level circuit arrangement of FIG. 13 is also assumed to be mounted in the cover 10 instead of the other circuits explained above.

All of the circuits of FIGS. 10 through 13 are alternative forms of apparatus for use with the apparatus of FIGS. 1 and 2, for example, as well as in connection with FIGS. 3, 4, 5, 6, 7 and 8. The shunt trip coil 33 shown in these circuits are shown in FIG. 9A and is assumed to be tripped by the energization of one trip coil. The AC source shown in these FIGS. 10 through 13 may be supplied from a connection to a phase conductor and neutral as shown in FIG. 9A. It may be either a reduced voltage or it may be a voltage the same as supplied to the load conductors depending upon the design of the circuit breaker. Preferably this alternating current voltage is in the order of 110 volts but it of course may be other voltages which will then require appropriate selection of the elements connected thereto.

In the conduits shown in FIGS. 1 and 2, the four conductors of FIG. 9A are assumed to be located. These conductors may take various positions in the conduit, and in so doing one or two of the conductors may be closer to the magnetic core means 25 than the other conductors. This may render the device slightly unequally responsive to fault currents in the different conductors, in which event the form of FIG. 3 or the form of FIG. 4 may be employed.

In FIG. 3, the core structure 14 is shown as replaced by a group of laminations 48 which are suitably connected to the U-bolt 25. Since there is no metal barrier between the cables and the laminated core structure 48, the more readily magnetizable laminations will be more responsive to the fluxes generated by currents in the conductors more nearly adjacent thereto.

In the event that greater uniformity of response is required than supplied by the U-bolt 25 of FIGS. 1, 2 and 3, it is replaced by a formed strap 49 of FIG. 4. This formed strap more closely conforms to the periphery of the insulator member 24 between the conduit sections, and thus the flux produced by the several conductors 36, 37 and 38 more equally generate the flux therein. These FIGS. 3 and 4 as modifications of FIGS. 1 and 2 are of course assumed to have the same circuitry as shown in any one of the FIGS. 10 through 13. The operation is entirely the same. However, it is assumed that FIGS. 3 and 4 would be more particularly applicable to the zero sequencing type of detection illustrated in FIG. 9A. It has been pointed out above, that if the collars 22 and 23 of FIG. 2 are made of magnetic material and are located relatively close together, they serve to concentrate the flux pattern so that the locations of the various conductors in the conduit have less effect on the fault detector insofar as uniformity of response is concerned. This feature may be used, if desired, with the forms shown in FIGS. 3 and 4.

Although FIGS. 1, 2, 3 and 4 are contemplated for detection of relatively low ground fault currents in the order of ten to forty amperes, the actual load currents carried by the conductors 36, 37, 38 and 39 may be relatively high. In the event such conductors are carrying relatively high loads, it may be desirable to place at the bottom of the box 10 a high-mu metal base or cover. This would minimize the induction of voltages in the coil 11 directly by the flux from a high load current carrying conductor, and in particular would minimize the effect of an adjacent conductor through the air as compared to the more distant conductors.

In FIG. 9B, the organization of the fault detector and trip coils is similar to that shown in FIG. 9A. However, the fault detector instead of operating in the "zero sequence" fashion, the magnetic core means 25 of the detector is positioned to encircle the strap 26 connecting the two sections of conduit. Any ground current that may be flowing through the conduit sections 20 and 21 to the ground connected to the metal service case will flow through this conductive strap 26. Thus, the fault detector 9 with its magnetic core means 25 encircling the strap 9 will respond directly to the ground fault current.

Figure 5:
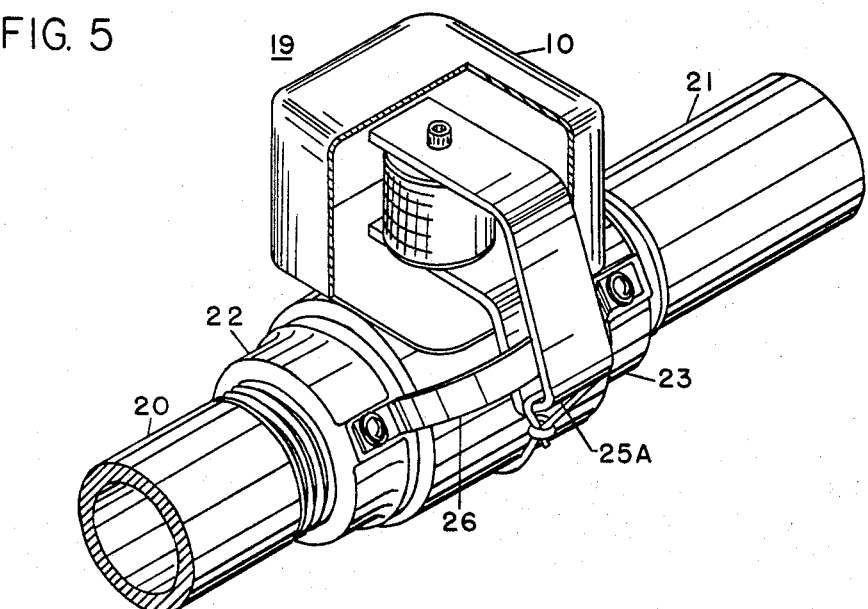
FIG. 5 is an isometric view of the fault current detector constructed to detect ground current directly in accordance with the present invention.
Figure 6:
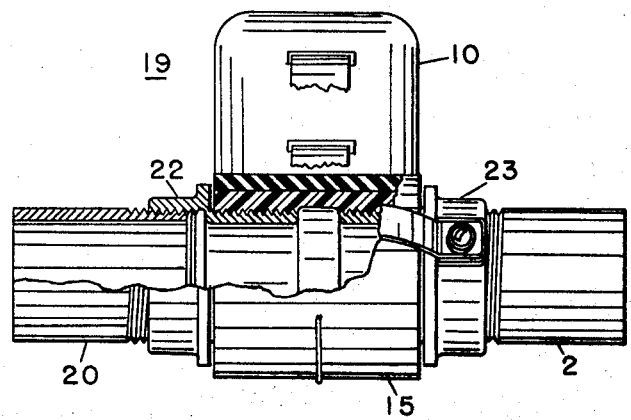
FIG. 6 is a wide view of FIG. 5 showing such detector mounted on an insulated section of the conduit.
Figure 7:
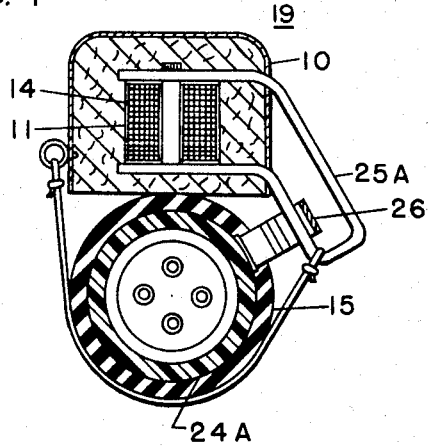
FIG. 7 is a sectional view of FIG. 6 showing the manner in which its extending core envelopes the ground interconnection between adjoining conduit ends.

The structure for this form of detector is slightly modified from FIGS. 1 and 2 as shown in FIGS. 5, 6 and 7. Referring to FIG. 5, it can be seen that the fault detector with its box 10, coil 11, core 14, has its core extension extending outwardly to one side of the box. This core extension 25A encircles the strap 26 and can be entirely constructed of a single piece of metal. It is noted that the sections of conduit 20 and 21 have the same collars 22 and 23. Such collars need only to be far enough apart to provide electrical isolation.

As a matter of fact the coil 11 is so positioned that any flux that does pass through the slot between the collars 22 and 23 will have a minimum effect upon the coil. Such coil is to be responsive to the flux in the core 14 and its extension 25A. In the event magnetic flux which is produced by the currents flowing in the insulated conductors 36, 37, 38 and 39 located in the conduit, should unduly effect the coil 11 and its related magnetic core means, a high-mu strip of metal may be located to encircle the insulator section 24A and minimize the effect of flux passing through the air to coil 11 and core 14.

The detector unit 19 is mounted on the insulator section 24A by a suitable cord or strap which is tightened to slightly compress the soft rubber sleeve 15 of the unit 19. Any one of the circuit diagrams of FIGS. 10 through 13 may have the respective components appropriately selected and mounted in the cover 10. The operation of the detector 19 insofar as the circuits of FIGS. 10 through 13 are concerned remains exactly the same. The presence of a ground fault current will either energize the shunt trip coil 33 or not depending upon the value of the fault current. It is of course assumed that a predetermined value of fault current is selected to cause such operation. With regard to FIG. 13, the two levels of response can be appropriately chosen by selecting the appropriate voltage values for the different Zener diodes B3 and B4 and associated silicon rectifiers SCR5 and SCR6.

Figure 8:
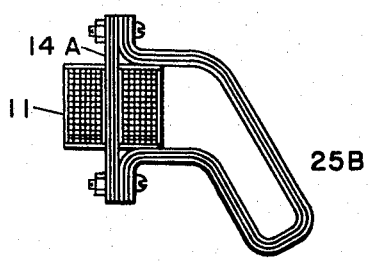
FIG. 8 is a modification of FIG. 7 showing a laminated core for the detector coil and for surrounding the ground interconnection between adjoining conduit ends.

In the event that relatively low fault currents need to be detected, it may be desirable to render the detector somewhat more sensitive to the flux produced by such relatively low fault currents in which case a laminated core 14A and a laminated extension 25B can be employed as shown in FIG. 8.

Referring to FIG. 14, a top sectional vew of the box 10 is shown to illustrate how elements of any one of the figures of FIGS. 10 through 13 may be encapsulated in a suitable compound with the external connections being extended for attachment to the shunt trip coil and the AC source shown in FIGS. 9A and 9B. This FIG. 14 is intended to be illustrative of the encapsulation with regard to all of the figures shown herein.

The above description with regard to FIGS. 5, 6, 7 and 8 has been with regard to detecting the flow of ground fault current in the conducting strap 26 connected between two electrically isolated sections of conduit. However, it is to be understood that the detector 19 can just as well have its magnetic core means 25A surround the ground connection for the neutral bus NB of FIG. 9B. In some installations, it might be desirable to have a fault detector 19 for each of the several branch circuits leaving the service entrance equipment and to also have a fault detector 19 associated with the ground connection for the neutral bus NB. In this latter case, it would be of course necessary to provide the fault detectors with the appropriate detecting values corresponding to the circuits that they protect.

Since the forms of the invention shown in FIGS. 5, 6, 7 and 8 is more particularly adapted for surrounding a particular conductor, shown as 26, it is to be understood that such device 19 may also be associated with a single conductor which is carrying load current and thus have such device act as an over-load protective device.

In other words, the device disclosed herein may have various uses, but in all such uses and forms, the magnetic core means is suitably designed to have an appropriate reluctance so that it will have an appropriate response to the specific preselected value of current which it is to detect and yet not be adversely affected by the occurrence of extremely high currents in the circuit or circuits with which such device is associated. In this way, the effects of such high currents will not cause excessively high voltages to be induced in the detector coil 11.

It is noted that in the above description the term reluctance has been employed; and it is assumed that the value of reluctance is appropriate for the purposes intended. It is also to be understood that the term reluctance is expressed as follows:

$$R = l/uA$$

where:

R = reluctance
$l$ = length of magnetic circuit
A = cross sectional area of magnetic circuit
$u$ = permeability It should be understood that the reluctance is of course selected by suitably choosing the appropriate magnetic material as well as determining the length of the magnetic circuit and its cross sectional area. Such selection of magnetic material will of course require a material of relatively low permeability depending upon the values involved. The use of such magnetic material with relatively low permeability avoids the use of voltage limiting devices in connection with the output coil 11 which would inherently be necessitated by the use of high permeability magnetic materials. In this way the apparatus of the present invention is not only simplified, but it is protected from undue voltages by reason of the characteristic of its materials which characteristics are not subject to change or ambient conditions.

Having thus described several forms embodying the present invention, it is desired to be understood that these forms are selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What we claim is:

1. In an electrical alternating current supply system, the combination of a plurality of insulated conductors connected to said supply and running to a load, a winding mounted on a core of magnetic material surrounding said conductors, said core having relatively low permeability characteristics so as to provide relatively narrow spread of voltages induced in said winding for the range of differential alternating currents in said conductors of higher value than permitted for normal operation, and detecting means connected to said winding and responsive to the alternating current induced in said winding in response to the differential currents in said conductors above a preselected value, whereby abnormal currents and voltages are prevented in said winding during the occurrence of relatively high phase-to-ground faults by reason of the low permeability characteristics of said magnetic core.

2. In an electrical alternating current supply system, the combination of a plurality of insulated conductors passing through two adjacent sections of a metal duct, an insulator portion located between two said adjacent sections of metal duct and acting to structurally connect said sections together, a winding mounted on a magnetic core surrounding said insulator section and said conductors, whereby differential alternating currents in said conductors produce a flux in said core which in turn induces alternating current in said winding, said core being capable of producing an amount of alternating current flux in accordance with its relatively low permeability characteristics, detecting means connected to said winding and responding to its alternating current at or above a predetermined value of flux in said core, said detecting means being effective to give a control output when said differential currents reach a predetermined value.

3. In an electrical system as set forth in claim 2, wherein said two sections of metal duct are connected by an electrical conducting cable located outside of said magnetic core.

4. In an electrical system as set forth in claim 2, wherein said two adjacent sections of metal duct are relatively close together in the order of one inch separation to thereby provide a substantially uniform induction of magnetic flux in said magnetic core by currents of the same value in the respective conductors of said plurality.

5. An electrical fault detector for alternating current circuits comprising in combination, a magnetic core means of low magnetic permeability for surrounding an electrical conductor carrying a fault current, a winding on said core means responsive to magnetic flux therein as produced by said current in said conductor for producing an alternating current output, means for rectifying said alternating current output, and circuit means responsive to said rectified output when it reaches a predetermined value for giving an indication of the presence of a fault.

6. An electrical system as set forth in claim 5, wherein timing means is connected to said circuit means to delay the giving of said indication a preselected time following the time said rectified output reaches said predetermined value.

7. In combination, two adjacent sections of conductive conduit, a metal collar for each adjoining end of said sections of conduit, an insulator section physically joining said two collars but maintaining a limited space between them, whereby said two sections of conduit are physically joined for providing a space for running insulated conductors through the conduit, an electrical conductive strap connecting said two collars for carrying any fault current that may exist between said insulated conductors and the ground connection for said conduit sections, a detector unit including a magnetic core means of low magnetic permeability encircling said conductive strap, a coil on said magnetic core means, rectifier means connected to the output of said coil, and means responsive to said rectified output for indicating the presence of a fault current in said conductive strap.

References Cited

UNITED STATES PATENTS

| | | | |
|---|---|---|---|
| 3,062,495 | 11/1962 | Sloop | 336—67 |
| 3,165,671 | 1/1965 | Mintz et al. | 317—27 |
| 3,213,321 | 10/1965 | Dalziel | 317—18 |
| 3,259,802 | 7/1966 | Steen | 317—18 |
| 3,286,129 | 11/1966 | Gagniere | 317—18 |

LEE T. HIX, *Primary Examiner.*

R. V. LUPO, *Assistant Examiner.*

U.S. Cl. X.R.

317—18, 27, 33